United States Patent [19]
Hamzaoui et al.

[11] Patent Number: 4,648,101
[45] Date of Patent: Mar. 3, 1987

[54] MLS ON-BOARD RECEIVER CIRCUIT TO DECODE FAST-SCANNING BOOSTED PREAMBLE

[75] Inventors: Salim Hamzaoui, Bourg la Reine; Michel Schilliger, Morangis, both of France

[73] Assignee: LMT Radio Professionnelle, Boulogne Billancourt, France

[21] Appl. No.: 710,113

[22] Filed: Mar. 11, 1985

[30] Foreign Application Priority Data

Mar. 13, 1984 [FR] France ............................... 84 03801

[51] Int. Cl.⁴ ..................... H03D 1/04; G08C 19/00
[52] U.S. Cl. ........................................ 375/99; 375/94; 340/825.63; 340/825.64; 342/195
[58] Field of Search ................... 375/94, 99, 102, 103; 343/7 AG, 17.1 R, 17.1 PF, 17.1 PW, 421; 340/825.6, 825.63, 825.64, 825.69, 825.3

[56] References Cited

U.S. PATENT DOCUMENTS

| | | | |
|---|---|---|---|
| 2,489,297 | 11/1949 | Labin et al. ................ | 343/17.1 PW |
| 2,916,618 | 12/1959 | Adams et al. ........................ | 375/94 |
| 3,051,928 | 8/1962 | Sullivan ............................ | 340/825.6 |
| 3,076,145 | 1/1963 | Copeland et al. .................... | 375/102 |
| 3,299,404 | 1/1967 | Yamarone et al. .................... | 375/94 |
| 3,510,870 | 5/1970 | Woollvin .................... | 343/17.1 PW |
| 3,555,438 | 1/1971 | Ragsdales ............................ | 375/103 |
| 3,898,571 | 8/1975 | Caprio .................................. | 375/94 |
| 3,922,676 | 11/1975 | Berry et al. ................ | 343/17.1 PF |
| 3,976,970 | 8/1976 | Tuffet et al. ...................... | 340/825.6 |

Primary Examiner—Robert L. Griffin
Assistant Examiner—M. Huseman
Attorney, Agent, or Firm—Oblon, Fisher, Spivak, McClelland & Maier

[57] ABSTRACT

The decoding circuit of the invention comprises essentially a digital filter 16, a pulse-width recognition circuit 17 a pulse peak amplitude selection circuit 23 and a circuit for decoding MLS boosted scanning pulse pairs 32 to 38. This decoding circuit makes it possible to eliminate parasite pulses from a clutter source whose width is incorrect when compared to the width of useful pulses and also to eliminate pulse pairs that have the right width but do not have the right interval.

5 Claims, 2 Drawing Figures

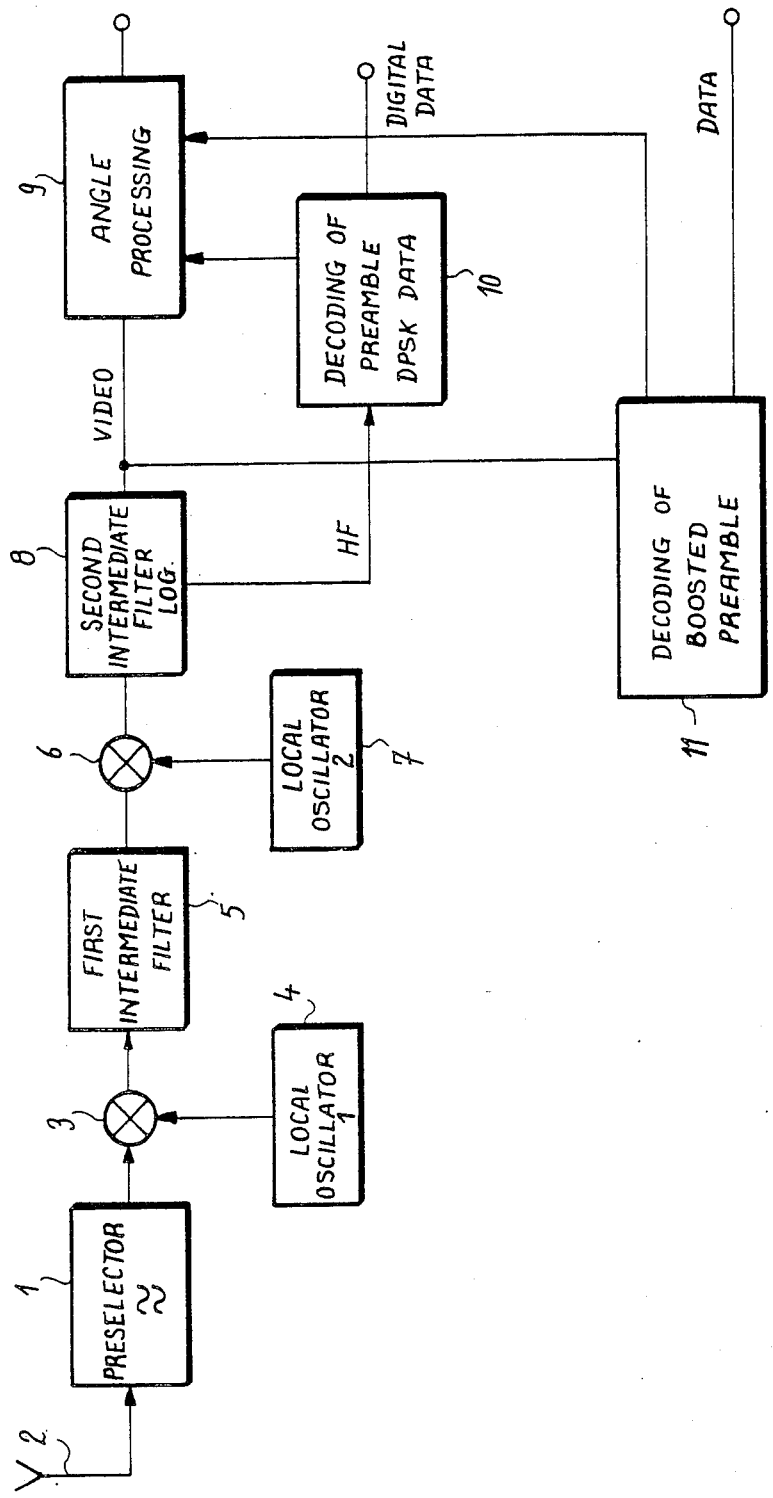

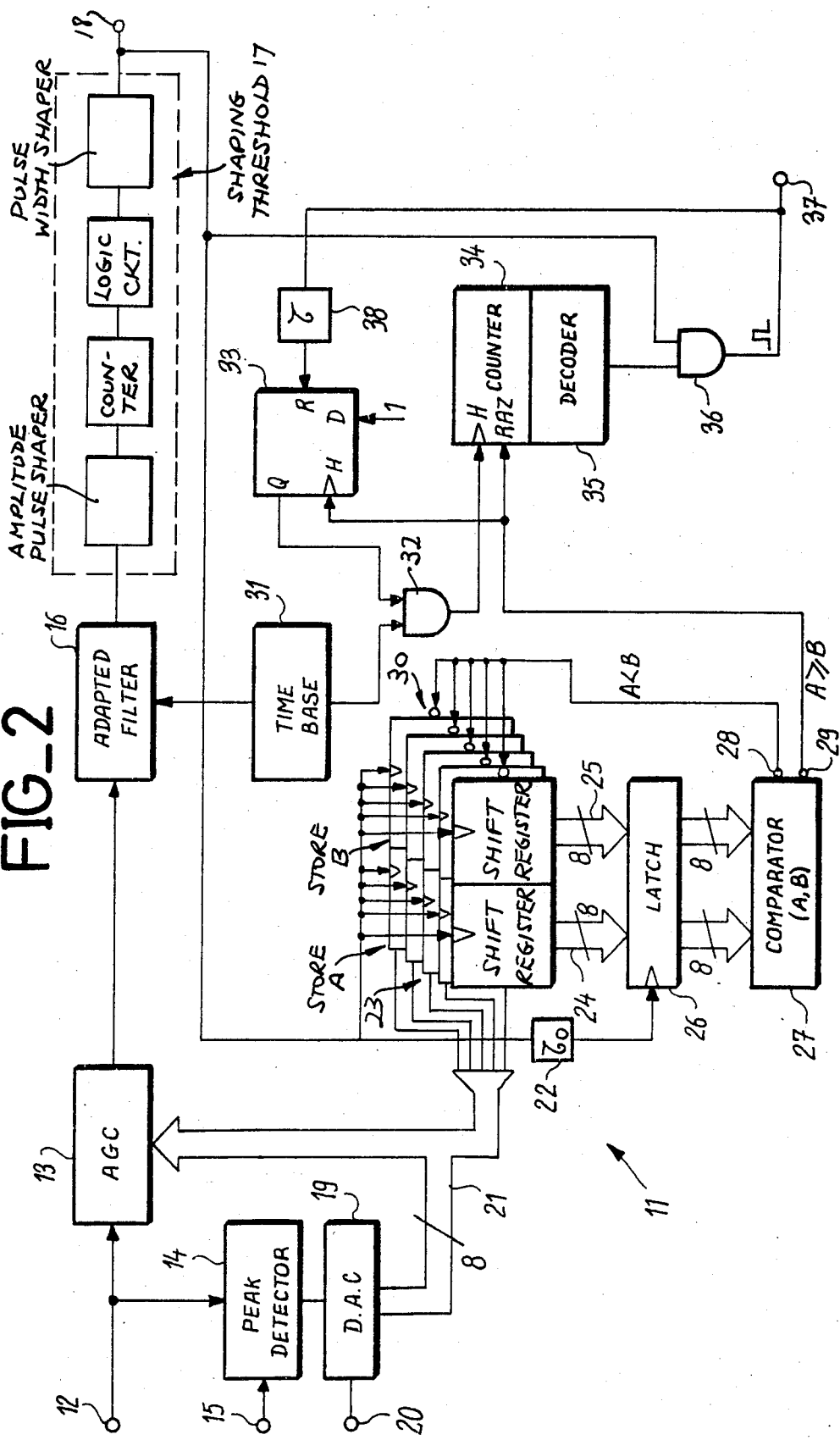

MLS ON-BOARD RECEIVER CIRCUIT TO DECODE FAST-SCANNING BOOSTED PREAMBLE

BACKGROUND OF THE INVENTION (1) Field of the Invention

The present invention concerns an on-board MLS receiver circuit for decoding a fast-scanning boosted preamble.

(2) Description of the Invention

The French patent application No. 83 10 239 (published Jan. 18, 1985 and granted Apr. 1, 1986 as U.S. Pat. No. 2,549,321). describes an anti-clutter process for an MLS (Microwave Landing System) system wherein the revolving beam of the ground transmitter broadcasts an additional preamble for each function or group of functions, this additional preamble (called the "boosted preamble") being made up of pulse pairs used to identify the associated functions that follow them. This patent application also describes an on-board receiver that is capable of receiving, decoding and using a boosted preamble of this kind.

The decoder of this on-board receiver works well when there is no clutter, but is not protected against noise in general and against clutter pulses in particular.

The subject of the present invention is an on-board MLS receiver circuit to decode a fast-scanning boosted preamble, namely a decoding circuit that is efficiently screened against noise and clutter pulses insofar as the amplitude of these pulses is smaller than that of the pulses to be received or insofar as their shape is different.

SUMMARY OF THE INVENTION

The decoder conforming to the invention comprises a digital filter adapted to useful pulses. To describe it in greater detail, the decoder of the invention comprises a peak detector, an automatic amplification control circuit, a digital filter followed by a pulse-width recognition circuit, a pulse peak amplitude selection circuit and a circuit to decode pulse pairs.

BRIEF DESCRIPTION OF THE DRAWINGS

A better understanding of the present invention will be derived from reading the detailed description of a preferred embodiment, taken as a non-exhaustive example and illustrated in the appended drawing wherein:

FIG. 1 is the simplified block diagram of an MLS on-board receiver incorporating the decoder in accordance with the invention, and FIG. 2 is the detailed block diagram of the decoder in FIG. 1

DESCRIPTION OF THE PREFERRED EMBODIMENT

The MLS on-board receiver, represented in a simplified manner in FIG. 1, is well known to the art and shall be described only very briefly, with the sole purpose of locating the position of the boosted preamble decoder of the invention.

This on-board decoder consists essentially of the following elements in succession: an input pre-selector 1, connected to a receiver aerial 2, a first mixer 3 connected to a first local oscillator 4, a first intermediate frequency amplifier 5, a second mixer 6 connected to a second local oscillator 7, and a second intermediate frequency amplifier 8. The amplifier 8 is connected on the one hand to an angle processing circuit 9 providing, at its output, azimuth direction and elevation angle values and, on the other hand, to a DPSK phase demodulation and preamble and data decoding circuit 10, supplying circuit 9 with synchronizing signals (time reference obtained on the basis of a 0–1 transition of the standard preamble).

The output of the amplifier 8 is also connected to a boosted preamble decoding circuit 11, of which a detailed description is given below in reference to FIG. 2. The synchronizing signals output (time reference obtained from the boosted preamble) of the circuit 11 is connected to circuit 9. Since the elements 1 to 10 are well known, from the above-mentioned patent application for example, they shall not be described in greater detail.

The circuit 11 (FIG. 2) incorporates an input terminal 12 (connected to the output of 8). The input 12 is connected, in circuit 11, to the input of an automatic gain control (AGC) circuit 13 and to a peak detector circuit 14 that incorporates a zero-resetting control input 15. The circuit 13 is followed by a digital filter 16 (for example of the transversal type), whose weighting coefficients are determined, in a manner known to the art, to adapt this filter to useful pulses, namely boosted scanning pulses. The circuit 16 is followed by a pulse-width recognition circuit 17 incorporating a pulse shaper with a fixed amplitude threshold such as an amplitude clipper that produces square pulse outputs, a counter circuit that counts the width of the pulses from the output of filter 16 to determine the duration of the shaped pulses in terms of the number of clock pulses equal to this duration, a logic circuit to eliminate pulses lacking the requisite width thus enabling only shaped pulses having a duration falling within a certain tolerance gap and a pulse shaper that brings all pulses that have passed through filter 16 and the threshold circuit to a constant width thus causing all pulses which fall within the tolerance gap to have exactly the same length, the output terminal of circuit 17 bearing the reference 18.

The output of the peak detector 14 is connected to the analog input of an analog-to-digital converter (ADC) 19 incorporating a conversion control terminal 20. The digital output of the converter 19 is connected to a digital bus 21. The bus 21 is, moreover, connected to the circuit 13 of the AGC and to the input of the bi-directional shift storage bank 23. In a preferred embodiment, the bank 23 comprises 8 bi-directional shift registers, each with two cells. Each of the conductors of the bus 21 is connected to a series input of a corresponding register. The output of each of the initial cells of the eight registers is connected to a corresponding conductor of a bus 24, and the output of each of the second cells of the eight registers is connected to a corresponding conductor of a bus 25. The first eight cells of the said registers make up a store A with eight binary elements, and the second set of eight cells make up a store B, also with eight binary elements.

The buses 24 and 25 are connected through a register (or latch) 26 to a logic comparator 27. The comparator 27 incorporates an output 28 which is active when the content of the store A is smaller than that of the store B, and an output 29 which is active when the content of A is equal to or greater than that of B. The output 28 is connected to the input 30 of the shift control on the left side of the bank 23. The output of the circuit 17 is linked to the clock inputs of the stores A and B and, through a delay circuit 22 (with a delay of $\tau_0$) to the clock input of the register 26. The elements 23, 26, 27 form the said peak amplitude selection circuit.

The circuit 11 incorporates a time base circuit 31 (clock signals generator) connected to the filter 16 and to an input of an AND gate 32, whose second input is connected to the output Q of a D-type bistable trigger circuit. The output 29 of the comparator 27 is connected to the clock pulses input of the trigger circuit 33 and to the zero-resetting input of a counter 34. The output of the counter 34 is connected to a state decoder 35 whose output, which is active when a specified state has been detected by the decoder, is connected to an input of an AND gate 36, the other input of this AND gate being connected to the output of the circuit 17. The output of the gate 36 is connected to an output terminal 37 and also, through a delay circuit 38, to the zero-resetting input R of the trigger circuit 33. The data input of the trigger circuit 33 is preset at "1".

When in initial impulse arrives from the video output of the MLS receiver to the terminal 12, the amplitude of this pulse is standardized by the AGC circuit 13. At the same time, this pulse arrives at the peak detector 14 which, after the passage of each pulse, is reset at zero by an ancillary circuit (not shown) whose construction is obvious to those skilled in the art. The detector 14 stores the peak value of this pulse and this peak value is converted into a digital value by the converter 19 which is controlled in a conventional manner by the terminal 20. If the circuit 17 recognizes that the said pulse, having crossed the filter 16, is of the right width, it produces a signal (for example, a binary "1") at terminal 18, indicating that this pulse is right, and this signal controls the storage, especially in the store A, of the said digitalized peak value of this signal. The earlier content of the store A passes into the store B.

As soon as a second pulse comes to the terminal 12, and as soon as its width is recognized to be right by the circuit 17, its peak value V2 is allowed into the store A whose content V1 is shifted into the store B, and after a delay $\tau_0$, the contents of the stores A and B are allowed into the register 26. (The delay period $\tau_0$ is slightly greater than the period needed to carry out the rightward shift). At this moment, the register 26 presents the comparator with value V2 on side A and value V1 on side B. If V2 corresponds to a true and useful pulse, V2 is substantially equal to V1 and the comparator 27 sends a signal "1" to its output 29, indicating that the condition $A \leq B$ is met (naturally, to allow for fluctuations in true pulses received, the condition $A < B$ is met only when A is distinctly smaller than B).

Furthermore, as the input D of the trigger circuit 33 is preset at "1", its output Q changes to "1" when the first active pulse edge reaches its clock input H (since the MLS system is already assumed to have received at least one true pulse, the output 29 has already been active and the output Q of the trigger circuit 33 has already changed to "1"). The clock pulses produced by the circuit 31 can therefore reach the input H of the counter 34 whose counting is done at the pace of these clock pulses. Every active pulse edge that appears at the output 29 of the comparator 27 resets the counter 34 at zero.

The decoder 35 has the task of recognizing a counting state of the counter 34 that corresponds to the period of time separating the peaks of two pulses that belong to one pair of true pulses. Given that the AND gate 36 is connected to the output of the decoder 35 and the output of the circuit 17, its output is active only when the following two conditions are met simultaneously: firstly, that the said period of time has elapsed and secondly, that a true pulse is recognized. Thus, if at the end of this period of time, no incoming pulse is recognized by the circuits 16 and 17, the output of the gate 36 stays inactive and hence the trigger circuit 33 does not change its state so that the clock pulses of 31 continue to go through the gate 32 and make the counter 34 move forward.

If, on the contrary, after the counter 34 is reset at zero by an initial boosted preamble pulse recognized to be true (a pulse whose peak value is V2 as specified above), a second pulse is recognized to be a true one exactly at the end of the said period of time, then the gate 36 opens. A boosted preamble pulse pair recognition pulse is produced at the terminal 37 for use by appropriate computing circuits (not shown). In addition, this recognition pulse goes through the delay circuit 38, whose delay is substantially equal to half of the width of a preamble pulse (the purpose of this is to avoid stopping the counter 34 before the end of the second preamble pulse). At the end of this delay period, the trigger circuit 33 is reset at zero, and its output Q is preset at "0", and cannot return to "1" unless another active pulse edge reaches its input H, i.e. when another boosted preamble pulse (belonging to a subsequent pair) has been recognized to be true. The counting of counter 34 is then inhibited.

If, after the said boosted scanning pulse with a peak value of V2, there is a pulse whose shape is recognized to be correct by the circuits 16 and 17 but whose amplitude is insufficient (with a peak value of V3 < V2), then the value V2 is shifted into the store B and the value V3 is stored in the store A. On the arrival of another scanning pulse recognized to be right, the register 26 presents the values V3 and V2 to the comparator 27 whose output 28 becomes active and controls the shift to the left side of bank 23, i.e. the value V3 is lost and the value V2 goes back into the store A. Consequently, the circuit including, in particular, the elements 23, 26 and 27, is a circuit for storing or selecting the maximum peak value of a validated pulse (through the circuits 16 and 17, namely of the right width), the result of this being that this selection circuit rejects all pulses that have the right shape but are of insufficient amplitude.

When the circuit of the invention is started, or so long as it has not received pulses of the right shape, the content of the stores A and B is nil as is the counting state of 34 (or it can be nullified by suitable, conventional initializing circuits). The peak value of the first incoming pulse of the right shape is stored in the store A. The second incoming pulse of the right shape validates the register 26 which presents the comparator with the initial content of A transferred into B, which is nil, and with the peak value of the first incoming pulse. The output 29 of the comparator is therefore made active and sets off the trigger circuit 33, hence the start of counting by 34. Subsequently, everything occurs in the manner described above and, in particular, if the said second incoming pulse is recognized to be true, a scanning pulse pair recognition signal is sent to the terminal 37.

The decoder described above thus makes it possible to eliminate parasite pulses from a clutter source, intentional or not, whose width is incorrect when compared to the rated width of the useful pulses, and also to eliminate pulse pairs that have the right width but do not have the right intervals or are not at the same level.

This decoder is suitable for various types of scanning, especially for quadruple and triple scanning. For quadruple scanning, the time reference, calculated by the circuits connected downstream of the terminal 37, corresponds to the instant located in the middle of two pulse pairs or to an instant shifted by a fixed value in relation to this middle. If triple scanning is used, the reference would be located in the middle of the last two pulses, corresponding to scans that go forward and then return.

We claim:

1. Microwave landing system on-board receiver circuit to decode fast-scanning boosted preambles, comprising a digital filter (16) having filter coefficients for receiving boosted preamble pulses, the input of said receiver circuit connected to a peak detector (14) and an automatic gain control circuit (13) said automatic gain control circuit connected to said digital filter the output of which is connected to a pulse-width recognition circuit (17), a pulse peak amplitude selecting circuit (23), (26), and (27) connected to said pulse-width recognition circuit and said peak detector circuit, the output of said pulse peak amplitude selecting circuit being connected to a pulse pair decoding circuit (32), (33), (34), (35), (36), (38).

2. Decoding circuit according to claim 1, wherein the said pulse-width recognition circuit (17) comprises a pulse shaper with a fixed amplitude threshold, a counter circuit, a logic circuit for the elimination of pulses that do not have the requisite width, and a pulse shaper that reduces all pulses reaching it to a constant width.

3. Decoding circuit according to claim 2, wherein the pulse peak amplitude selection circuit comprises a storage bank with bi-directional shift registers, each with two cells (23) the output of which is connected to a latch-type register (26) the output of which is connected to a logic comparator (27) whose output is connected to the output of the pulse-width recognition circuit.

4. Decoding circuit according to claim 3, wherein the pulse pair decoding circuit comprises a counter (34) whose zero-resetting input is connected to the output of the comparator which is active when it recognizes pulses whose peak level is right, and whose clock pulse input is connected to the output of an AND gate (32), one input of which is connected to a time base and to the output of a D-type flip-flop (33) the data input of which is fed with a logical 1 and the reset input of which is connected through a delay circuit (38) to the output of an AND gate (36) which itself is connected to the output of a state decoder 35 of the said counter 34 and to the output of the said pulse-width recognition circuit 17.

5. Decoding circuit according to claim 4 wherein the delay of the said delay circuit (38) is substantially equal to the semi-width of the boosted preamble pulses.

* * * * *